United States Patent
della Porta et al.

[15] 3,654,533
[45] Apr. 4, 1972

[54] ELECTRICAL CAPACITOR

[72] Inventors: Paolo della Porta; Tiziano A. Giorgi; Bruno Kindl; Mario Zucchinelli, all of Milan, Italy

[73] Assignee: S.A.E.S. Getters S.p.A., Milan, Italy

[22] Filed: May 1, 1970

[21] Appl. No.: 33,828

Related U.S. Application Data

[63] Continuation-in-part of Ser. No. 527,906, Feb. 16, 1966, abandoned.

[52] U.S. Cl. ............................................. 317/258, 317/261
[51] Int. Cl. .................................................................. H01b 1/01
[58] Field of Search ................................. 317/230, 258, 261

[56] References Cited

UNITED STATES PATENTS

| | | | |
|---|---|---|---|
| 2,104,018 | 1/1938 | Brennan | 317/230 |
| 3,365,626 | 1/1968 | Mohler | 317/258 X |

Primary Examiner—E. A. Goldberg
Attorney—David R. Murphy

[57] ABSTRACT

A capacitor comprising two capacitor plates and a dielectric between them. One plate is formed of an electrically conductive substrate having electrically conductive particles partially embedded therein.

9 Claims, 6 Drawing Figures

Patented April 4, 1972

3,654,533

INVENTORS
PAOLO dELLA PORTA
TIZIANO A. GIORGI
BRUNO KINDL
MARIO ZUCCINELLI

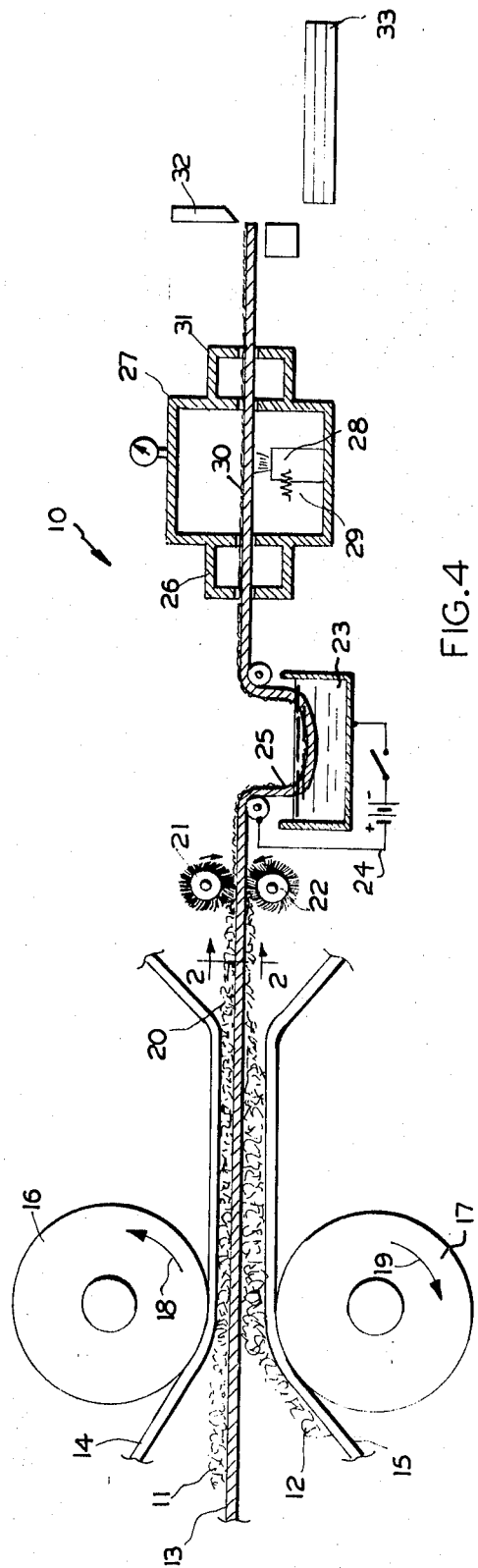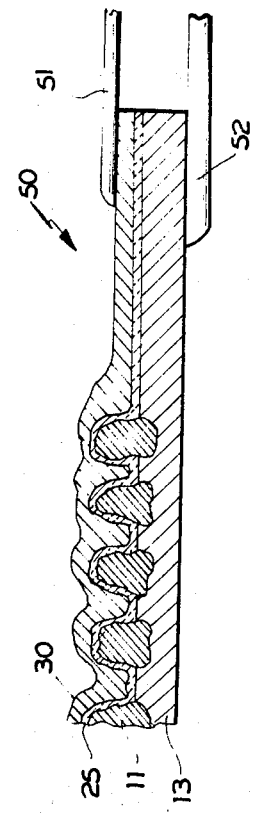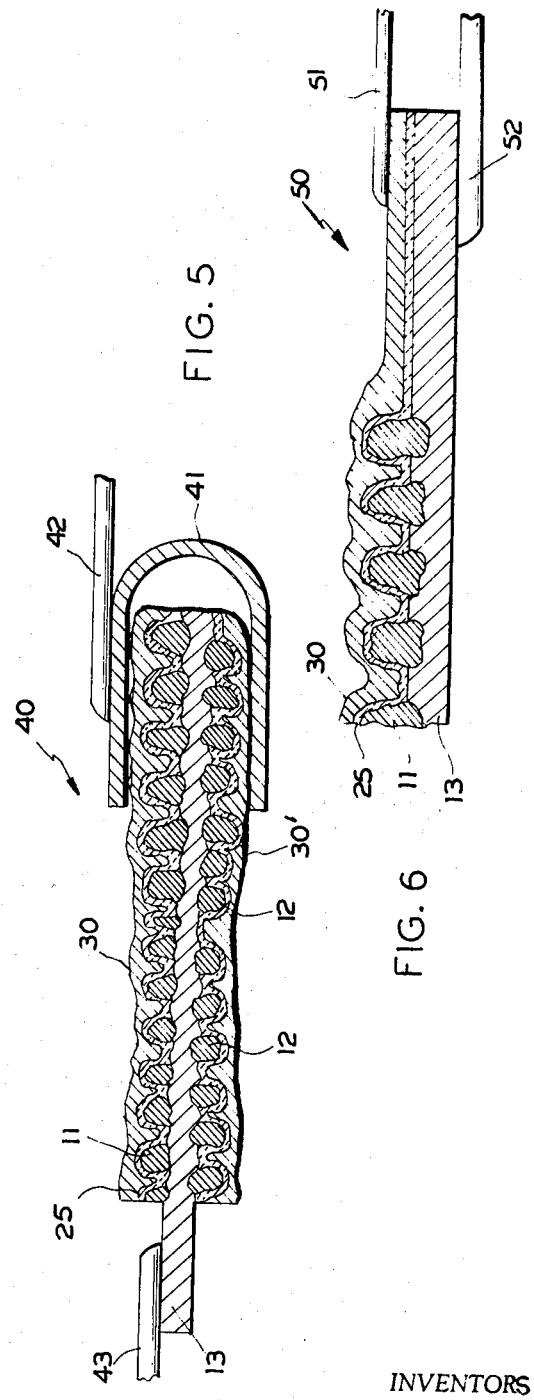
FIG. 4
FIG. 5
FIG. 6
INVENTORS
PAOLO dELLA PORTA
TIZIANO A. GIORGI
BRUNO KINDL
MARIO ZUCCHINELLI 3,654,533

ELECTRICAL CAPACITOR

CROSS REFERENCE TO RELATED APPLICATIONS

This application is a continuation-in-part of U.S. application Ser. No. 527,906 filed Feb. 16, 1966 now abandoned, the disclosure of which is incorporated herein by reference.

Process for producing intermediate structures useful in the present invention are described and claimed in copending U.S. application Ser. No. 33,794 entitled "Method of Producing Substrate Having a Particulate Metallic Coating" filed concurrently herewith.

It is well known that the capacitance of a capacitor increases with the increasing surface area of the capacitor plates. One of the oldest and most commonly employed means for increasing the surface area of a capacitor plate is by employing as part of the plate electrically conductive finely divided metal particles as described for example in Ruben U.S. Pat. No. 18,673 (1932) and its parent, U.S. Pat. No. 1,714,319 (1929). However, such capacitors using metal particles have found only limited acceptance. Likewise capacitors employing a particulate dielectric such as described by Waddell et al U.S. Pat. No. 3,247,019 and Boykin U.S. Pat. No. 3,348,971 have only met with limited success. Still other capacitors require the use of a binder to hold the metal particles in contact with the remainder of the capacitor plate. The use of such a binder is undesirable in that it sometimes insulates the particles from a substrate forming the remainder of the capacitor plate.

It is therefore an object of the present invention to provide an improved capacitor and process for producing such which are substantially free of one or more of the disadvantages of the prior art.

Another object is to provide an improved capacitor which has a greater capacitance than a parallel plate capacitor of substantially the same over all dimensions.

A further object is to provide an improved capacitor employing metallic particles which does not require the use of a binder to attach the metallic particles to the capacitor plate.

A still further object is to provide a process for producing improved capacitors, which process is simple and economical in operation.

Additional objects and advantages of the present invention will be apparent to those skilled in the art by reference to the following detailed description thereof and drawings wherein:

FIG. 4 is a schematic representation of an apparatus suitable for practicing the process of the present invention and;

FIG. 5 is a schematic representation of a preferred embodiment of a capacitor of the present invention and;

FIG. 6 is a schematic representation of an alternative embodiment of a capacitor of the present invention.

Figure 1:
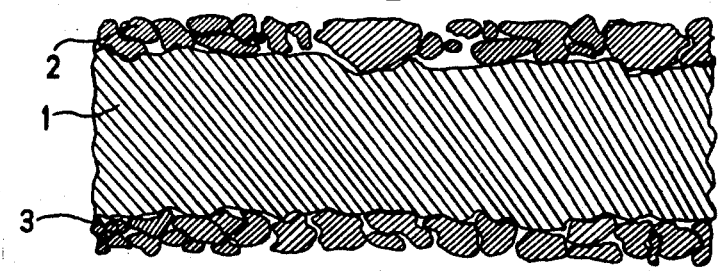
FIG. 1 is a cross-sectional view with an enlargement of about 300 diameters of a coated substrate produced by the method of the present invention wherein the coating has a thickness approximately equal to one particle diameter.
Figure 2:
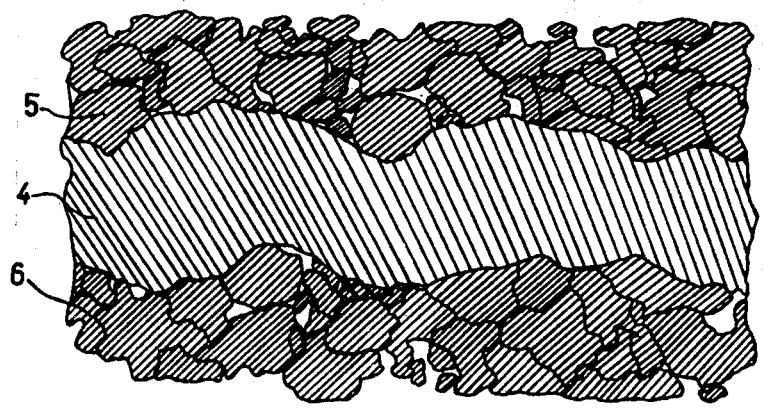
FIG. 2 is a cross-sectional view with an enlargement of about 300 diameters of a coated substrate produced by the method of the present invention wherein the particulate metallic coating has a thickness of approximately three particle diameters, this figure being a drawing corresponding to a microphotograph representing the structure taken along line 2—2 of FIG. 4.
Figure 3:
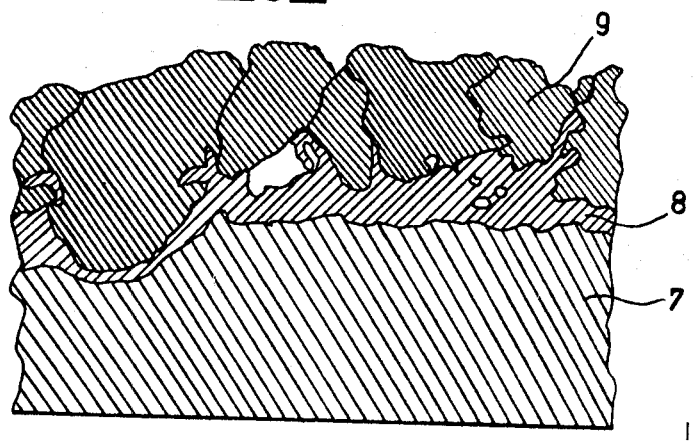
FIG. 3 is a cross-sectional view with an enlargement of about 1,300 diameters of a coated substrate produced by the method of the present invention wherein the original substrate comprised a hard base having a softer metallic coating thereon.

Referring now to the drawings and in particular to FIG. 1 there is shown a substrate 1 of stainless steel having an upper coating 2 and a lower coating 3 comprising metal particles of a zirconium alloy partially embedded in the surface of the substrate 1. FIG. 2 shows an iron substrate 4 having coatings 5 and 6 which have a total thickness which is approximately equal to three times the diameter of a single particle. As can be seen the metal particles in contact with the substrate 4 are partially embedded therein whereas the other particles are attached to one another or held in place by small cold microwelds (not shown) between the individual particles. FIG. 3 discloses a base 7 of iron having aluminum thereon which actually forms the substrate 8. The particles forming the coating 9 are partially embedded in this substrate 8. The structures shown in FIGS. 1 through 3 are processed further as described below to produce capacitors according to the present invention.

Referring now to FIG. 4 there is shown an apparatus 10 suitable for practicing the process of the present invention. In the practice of this process loose metal particles 11 and 12 are disposed respectively between a substrate 13 and an upper intermediate body 14 and the substrate 13 and a lower intermediate body 15. Most conveniently the metal particles 11 are placed on the substrate 13 whereas the metal particles 12 are placed on the lower intermediate body 15 to form a composite structure which is passed between the nip of two rolls 16 and 17 rotating respectively in the direction of arrows 18 and 19. The apparatus 10 is provided with means for maintaining the distance between the rolls less than the combined thickness of the substrate 13, particles 11 and 12, and intermediate bodies 14 and 15. In the preferred embodiment wherein the intermediate bodies 14 and 15 are work-hardenable the rolls 16 and 17 press the intermediate bodies 14 and 15 with a force such that the intermediate bodies 14 and 15 undergo plastic deformation with concurrent work-hardening while effectively pushing the metal particles 11 and 12 into the substrate 13 without substantially reducing the total surface area of the metal particles 11 and 12. It is important that the particles are only partially embedded in the substrate since the increased capacitance provided by the large surface area of the resultant capacitor plate will not be obtained if the particles are wholly embedded therein.

The entire composite structure then leaves the nip between rolls 16 and 17 with the intermediate bodies 14 and 15 adhering to the metal particles 11 and 12 which are embedded in the substrate 13 and are welded to one another by cold microwelds. The intermediate bodies 14 and 15 are then removed leaving behind the substrate 13 having particles 11 and 12 embedded therein. By virtue of the above described relationship in hardness between the metal particles 11 and 12, the substrate 13 and the intermediate bodies 14 and 15 the metal particles 11 and 12 adhere substantially completely to the substrate 13 rather than to the intermediate bodies 14 and 15. This relationship in hardness is critical to the successful practice of the method of the present invention. For example, if the intermediate bodies 14 and 15 are of the same hardness as the substrate 13 the particles 11 and 12 will be randomly embedded in the substrate 13 and the intermediate bodies 14 and 15. On the other hand if the substrate 13 is harder than the intermediate bodies 14 and 15 the particles will preferentially embed themselves into the intermediate bodies 14 and 15. If the particles 11 and 12 are softer than either the intermediate bodies 14 and 15 or the substrate 13 they will be plastically deformed losing their surface area and will not become embedded in the substrate 13.

The coated substrate 13 then passes between two cylindrical rotating wire brushes 21 and 22 rotating respectively in the direction of the arrows shown. These wire brushes 21 and 22 remove any loose particles which are not firmly attached to the substrate 13. The coated substrate 13 then passes into an oxidizing bath 23 provided with a conventional control circuit 24. In the chamber 23 the particles on the substrate 13 and the exposed portion of the substrate 13 are provided with a dielectric coating 25 which is generally an oxide coating. The substrate 13 then leaves the chamber 23 passes through a vacuum lock 26 into a vacuum deposition chamber 27 containing a source of metallic vapors such as a crucible 28 having a heating means 29. An electrically conductive metal is evaporated from the crucible 28 and deposits on both sides of the coated substrate 20 forming an electrically conductive coating 30 which constitutes the second plate of the capacitor. The substrate 13 then leaves the chamber 27 through vacuum lock 31. The substrate 13 with its dielectric coating 26 and electrically conductive coating 30 is then cut into convenient lengths by any suitable means such as a knife 32. Terminals not shown are then attached to the capacitors 33.

Referring now to FIG. 5 there is shown a preferred capacitor 40 of the present invention. The capacitor 40 comprises the substrate 13 having electrically conductive particles 11 and 12 partially embedded in the substrate 13. The substrate 13 together with the particles 11 and 12 form the first capacitor plate. The dielectric of the capacitor comprises the thin electrically non-conductive coating 25 disposed entirely over the exposed portion of the particles 11 and 12 and the substrate 13. Disposed entirely over the dielectric is the continuous electrically conductive coating 30 which forms the second plate of the capacitor. The capacitor 40 is also provided with a U-shaped connector 41 which electrically connects the upper conductive coating 30 with the lower conductive coating 30. The capacitor 40 is also provided with means for applying an electrical potential between the first and second plates in this case conductors 42 and 43.

Referring now to FIG. 6 there is shown another embodiment of the capacitor of the present invention wherein the particles are present only on one side of the substrate. The capacitor 50 comprises a substrate 13 having particles 11, dielectric coating 25 and metallic coating 30. The means for applying an electrical potential between he capacitor plates constitute conductors 51 and 52. The type the capacitor represented by the capacitor 50 is produced when the above described process is practiced with only the intermediate body 14 and the particles 11 with reference to FIG. 4 and with neither particles 12 nor lower intermediate body 15. In this embodiment the roll 17 is simply moved upward in order to effect the embedding of the particles 11 into the substrate 13.

In the broadest aspect the particles can be of any electrically conductive metal having the herein described hardness relationship. The particles are generally of a material having a resistivity of less than 10 and preferably less than $10^{-3}$ ohm-cm. at 20° C. Examples of suitable electrically conductive metals include among others iron, silver, copper, aluminum, zirconium, alloys thereof and mixtures thereof. The preferred metal is an alloy of 5 to 30 and preferably 13 to 18 weight aluminum, balance zirconium. The metal particles can have widely varying particle sizes but are generally those which pass through a U.S. standard screen of 10 mesh per inch and are preferably those which pass through a U.S. standard screen of 100 mesh per inch and are retained on a screen of 600 mesh per inch.

The electrically non-conductive coating disposed over the surfaces of the substrate and the particles forms the capacitor dielectric and is therefore preferably of a material having a high dielectric strength and a high dielectric constant. Generally a material is employed having a resistivity greater than $10^{+5}$ and preferably greater than $10^{+8}$ ohm-cm. measured at 20° C. While this coating must be of sufficient thickness to prevent the breakdown thereof when an electrical potential is applied across the capacitor, the coating is preferably very thin to prevent the filling of the spaces between and around the particles and a subsequent loss of surface area. The coating preferably comprises the oxides of the substrate and the particles since a thin, substantially uniform coating thereof is easily formed by merely passing the substrate and the partially embedded particles through a suitable oxidizing agent.

The substrate and the intermediate bodies can be of any metal which has the herein described hardness relationship. Examples of suitable metals include among others soft iron, steel, aluminum and stainless steel. It must be emphasized that the chemical nature of the elements making up the alloys employed as substrates and intermediate bodies is not critical. In fact it is conceivable that alloys of identical chemical composition can be employed as both provided that they have differing hardness. As is apparent to those skilled in the art differing hardnesses can be imparted by conventional metallurgical techniques such as heat treatment, cold rolling and the like.

The electrically conductive coating which is disposed over the entire surface of the non-conductive coating provides the second capacitor plate. While this coating may be of any of the suitable materials previously mentioned in conjunction with the substrate, it is preferably a thin continuous aluminum coating formed by conventional techniques of vapor deposition. Such a coating is preferred since it provides a thin, continuous coating over the entire surface of the non-conductive coating. The substrate preferably has a resistivity of less than 10 and preferably less than $10^{-3}$ ohm-cm. measured at 20° C. Aluminum is the preferred substrate material since it has a very low resistivity, a Vickers hardness which falls well within the preferred range, is easily formed into a thin, planar sheet, is lightweight and relatively inexpensive.

Broad and preferred ranges of Vickers hardness for the intermediate body, the metallic particles and the substrate are given in the following table:

| Component | Vickers Hardness Broad Range (kg/mm²) | Preferred Range (kg/mm²) | Example (kg/mm²) |
| --- | --- | --- | --- |
| Intermediate body | 10–600 | 100–300 | 180 |
| Particles | 100–∞ | 200–800 | 400 |
| Substrate | 1–400 | 10–200 | 90 |

The values given in this table are non-limiting in the sense that specific values within the above ranges must be chosen while maintaining the herein-described hardness relationship. In a preferred embodiment of the present invention the intermediate body has a Vickers hardness at least 50 and preferably at least 100 kg./mm.² less than the particles; and the substrate has a Vickers hardness of at least 40 and preferably at least 80 kg./mm.² less than the intermediate body.

The capacitor of the present invention can be provided with terminal leads attached in a conventional manner such as by soldering or spot welding, to facilitate its use in electrical circuits.

The invention is further illustrated by the following examples in which all parts and percentages are by weight unless otherwise indicated. These non-limiting examples are illustrative of preferred embodiments and are designed to teach those skilled in the art how to practice the invention and to represent the best mode contemplated for carrying out the invention.

EXAMPLE 1

In an apparatus similar to that shown in FIG. 4, particles 11 are placed on a substrate 13 beneath an upper intermediate body 14, whereas particles 12 are placed on a lower intermediate body 15.

The particles are an alloy of 16 weight percent aluminum balance zirconium available from S.A.E.S. Getters S.p.A. Milan, Italy, under the tradename St 101. They have a size such that they pass through a U.S. standard screen of 100 mesh per inch and are retained on a U.S. standard screen of 600 mesh per inch. St 101 in its sheet form exhibits a Vickers hardness of 400 kg./mm.².

The substrate 13 is of iron 0.010 inches thick having a Vickers hardness of 90 kg./mm.² the intermediate bodies 14 and 15 are of work-hardenable iron 0.010 inches thick having a Vickers hardness of 180 kg./mm.².

The intermediate bodies 14 and 15 with substrate 13 and particles 11 and 12 therebetween are then passed between the nip of the rolls 16 and 17 which press the intermediate bodies 14 and 15 with a force such that the intermediate bodies 14 and 15 undergo plastic deformation with concurrent work-hardening while effectively pushing the metal particles 11 and 12 into the substrate 13 without substantially reducing the total surface area of the metal particles 11 and 12.

The entire composite structure then leaves the nip between rolls 16 and 17 with the intermediate bodies 14 and 15 adhering to the metal particles 11 and 12 which are embedded in the substrate 13 and are welded to one another by cold microwelds. The intermediate bodies 14 and 15 are then removed leaving behind the substrate 13 having particles 11 and 12 embedded therein.

The coated substrate 13 then passes between the brushes 21 and 22 and into the bath 23 containing 0.1 weight percent sodium borate and 10 weight percent boric acid. The substrate 13 then leaves the chamber 23 passes into a vacuum deposition chamber 27 containing aluminum to form the vapor electrically conductive coating 20 which constitutes the second plate of the capacitor. The substrate 13 then leaves the chamber 27 and is then cut into convenient lengths. Terminals are then attached.

EXAMPLE 2

Example 1 is repeated except that the substrate 13 is of aluminum.

Thus it can be seen that by the present invention there has been provided improved capacitors which have a capacitance greatly increased over that of conventional parallel plate capacitors of substantially the same dimensions. There has also been provided a simple effective and economical process for producing such capacitors.

Although the invention has been described in considerable detail with reference to certain preferred embodiments thereof, it will be understood that variations and modifications can be effected within the spirit and scope of the invention as described above and as defined in the appended claims.

What is claimed is:

1. A capacitor comprising:
   a. a first capacitor plate comprising an electrically conductive substrate having electrically conductive particles partially embedded in at least one surface thereof;
   b. a dielectric comprising a thin, electrically non-conductive, coating disposed entirely over the exposed portions of said substrate;
   c. a second capacitor plate comprising a continuous, electrically conductive coating disposed over the surface of said non-conductive coating;
   d. means for applying an electrical potential between said first and second plates.

2. The capacitor of claim 1 wherein the metal particles are a zirconium aluminum alloy.

3. The capacitor of claim 2 herein the zirconium aluminum alloy contains 15 to 18 weight percent aluminum balance zirconium.

4. The capacitor of claim 1 wherein the substrate is iron.

5. The capacitor of claim 1 wherein the thickness of the metal particles on the substrate is equal to two to five times the average particle diameter.

6. The capacitor of claim 1 wherein the particles have a size such that they pass through a screen of 100 mesh per inch.

7. A capacitor of claim 1 comprising:
   a. first capacitor plate comprising:
      1. a thin, planar, electrically conductive substrate of a material having a resistivity of less than 10 ohm-cm. at 20° C. and a Vickers hardness of 10 to 200 kg./mm.$^2$;
      2. a layer of electrically conductive particles partially embedded in at least one planar surface of said substrate in electrical contact therewith, said particles having;
         a. a resistivity of less than 10 ohm-cm. at 20° C.,
         b. a Vickers hardness greater than that of said substrate, and
         c. a size such that they pass through a U.S. standard 100 mesh/inch screen;
   b. a dielectric comprising thin, electrically non-conductive coating disposed entirely over the exposed surfaces of said substrate and said layer of particles, said non-conductive coating having a resistivity greater than $10^5$ ohm-cm. and a substantially uniform thickness of 1 to 5 microns;
   c. a second capacitor plate comprising a thin, continuous, electrically conductive coating disposed over the entire surface of said non-conductive coating, said conductive coating being electrically insulated from said substrate and said particles by said non-conductive coating and having a resistivity of less than 10 ohm-cm. at 20° C. and,
   e. means for applying an electrical potential between said first and second plates.

8. A capacitor of claim 1 comprising:
   a. a first capacitor plate comprising:
      1. a thin, planar aluminum substrate,
      2. a layer of particles of a zirconium aluminum alloy partially embedded in both planar surfaces of said substrate in electrical contact therewith, said particles having a size such that they pass through a U.S. standard 100 mesh/inch screen, said alloy consisting of 84 percent by weight of zirconium and 16 percent by weight of aluminum, and said layer of particles being one to five particle diameters thick;
   b. a dielectric comprising a thin oxide coating disposed entirely over the exposed surfaces of said substrate and said layer of particles, said oxide coating consisting of a mixture of oxides of zirconium, oxides of aluminum and oxides of the metal of the substrate, said mixture having a resistivity greater than $1 \times 10^{+12}$ ohm-cm. and a substantially uniform thickness of 1 to 5 microns;
   c. a second capacitor plate comprising a thin, continuous, vapor-deposited aluminum coating disposed over the entire surface of said oxide coating, said aluminum coating being electrically insulated from said substrate and said particles by said oxide coating;
   d. means for applying an electrical potential between said first and second plates.

9. A dry capacitor comprising:
   a. a first capacitor plate comprising an electrically conductive substrate having electrically conductive discrete particles partially embedded in at least one surface thereof, wherein the particles are harder than the substrate;
   b. a dielectric comprising a thin, electrically non-conductive coating disposed entirely over the exposed portions of said particles and said substrate;
   c. a second capacitor plate comprising a continuous, electrically conductive coating disposed over the surface of said non-conductive coating;
   d. means for applying an electrical potential between said first and second plates.

* * * * *